Figure 1:
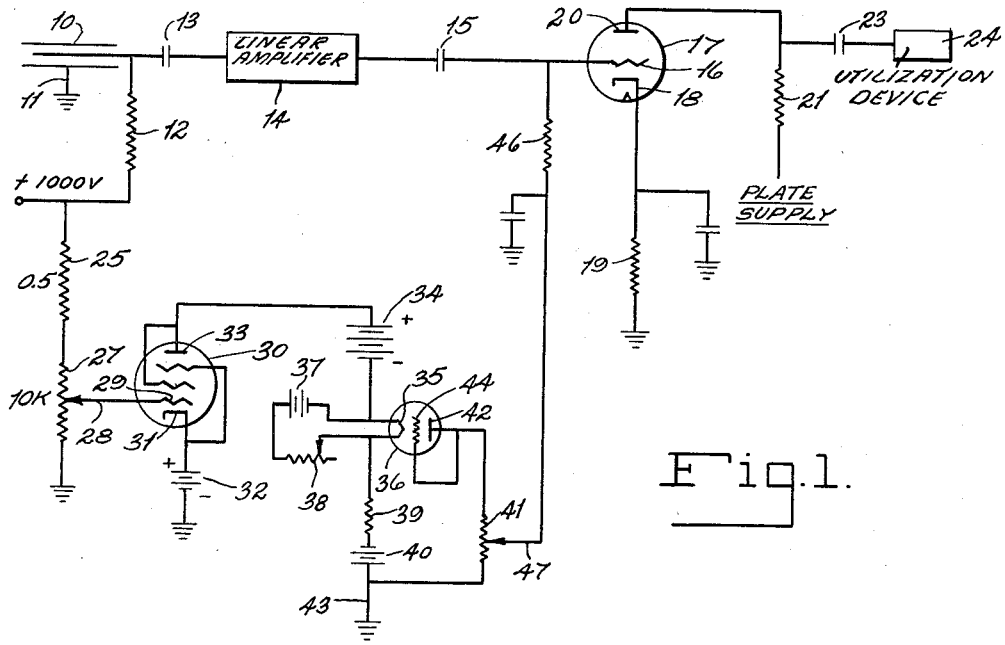

Dec. 8, 1953

K. C. CRUMRINE ET AL 2,662,188

VOLTAGE STABILIZING AMPLIFIER
SYSTEM FOR NEUTRON DETECTORS
Filed March 11, 1950

INVENTORS
KENNETH C. CRUMRINE
ROY P. MAZZAGATTI
BY
ATTORNEYS

Patented Dec. 8, 1953

2,662,188

UNITED STATES PATENT OFFICE 2,662,188

VOLTAGE STABILIZING AMPLIFIER SYSTEM FOR NEUTRON DETECTORS

Kenneth C. Crumrine, Tulsa, Okla., and Roy P. Mazzagatti, Houston, Tex., assignors to The Texas Company, New York, N. Y., a corporation of Delaware Application March 11, 1950, Serial No. 149,165

2 Claims. (Cl. 250—83.6)

The present invention relates to the operation of radiation detectors of the counter type and more particularly to methods and circuits for the operation and control of such radiation detectors in the range in which they operate as proportional counters. The present invention is particularly intended for use in applications in which the detector is subjected to radiations of varying types and in which it is desired to select and indicate or record responses due to certain types of radiation while eliminating those due to other types. Thus the invention is particularly applicable to the discriminatory indication or recording of the intensity of radiation due to alpha particles or to alpha particles and protons in the presence of radiation due to beta particles or gamma rays. The invention is employed, for example, in what is known as neutron well logging, in which it is desired to indicate or record the intensity of the scattered slow neutron radiation from structural formations bombarded by neutrons while eliminating or suppressing responses to gamma rays coming directly from the radiation source or being scattered by the surrounding material and also those due to natural or induced gamma rays from the formations.

In connection with the present invention, the detectors employed are of the counter or pulse-producing type and are operated in a range of applied voltages in which the size or amplitude of the pulses varies with the initial ionization caused by the radiation or particle producing the pulse; i. e., in what is known as the "proportional counter" range. When slow neutrons are to be detected, the counter is sensitized so that the slow neutrons or a certain proportion thereof passing through the field in which the counter is located will produce ionizing particles. Such sensitization is effected, for example, by coating the cathode elements of the detector with boron or lithium compounds, for example, boron carbide, or by employing within the detector a vapor or gaseous filling which includes boron fluoride. When so sensitized, bombardment with slow neutrons will cause the production of alpha particles from the isotopes of the boron or lithium compound used for sensitizing the detector.

The detector is at the same time sensitive to gamma rays, bombardment with which causes emission of beta particles. Thus the detector produces pulses as a result of the impingement of both slow neutrons and gamma rays. A detector suitable for use in accordance wtih the present invention is shown in the U. S. Letters Patent No. 2,462,471 granted to K. C. Crumrine February 22, 1949.

It is frequently desired to separately indicate or record the responses or pulses due to slow neutrons while eliminating the effect of those due to the gamma rays. Since the alpha particles resulting from slow neutron bombardment produce a greater initial ionization than the beta particles resulting from gamma ray bombardment, the pulses resulting from the action of the slow neutrons are of greater size or amplitude than those resulting from the action of gamma rays when the detector is oeprated in the proportional counter range; that is, under applied voltages below those of the operating range of the Geiger-Mueller counter, in which the size of the pulses becomes substantiailly independent of the initial ionization of the particles producing them.

Difficulty arises in the use of radiation detectors in the proportional counter range and particularly in such discriminatory use as is hereinbefore referred to, in that such counters are sensitive to even small changes in the voltage applied across the electrodes of the detector, such changes resulting both in changes of pulse size or amplitude and in the number of pulses produced in a field of given intensity or radiation. Such variations in voltage may result from changes in a self-contained high voltage source applied across the counter, such as a battery, or from changes in A. C. line current which may be transmitted down a bore hole to energize the power supply circuits of the counter. Similar variations may occur as a result of variations in the voltages impressed on the plates of tubes used in the amplifying and selecting or discriminating circuits with which the detector is coupled. In applications such as well logging such changes are likely to occur. In accordance with the present invention, the operation of the detector and the discriminatory action of the circuits associated with it are stabilized at a predetermined level irrespective of changes in the voltage such as those previously referred to.

In accordance with the present invention, the detector is associated with an amplifier channel or circuit in which, preferably after direct linear amplification of the pulses derived from the detector, any pulses of lesser amplitude than those due to the alpha rays are eliminated by control of the bias voltage on the control grid of one of the tubes in the amplifying circuit, generally a tube which receives the output pulses from the detector in positive polarity and after they have been linearly amplified. The grid bias of this tube may be pre-set so as to eliminate pulses of an amplitude less than a particular value at the normal and desired operating voltage at the counter, which may be, for example, 1000 volts. Assuming a constant neutron flux, if the voltage on the counter be increased somewhat, say to 1010 volts, the amplitudes of the pulses formed within the counter as well as the number of detectable pulses is increased. So likewise, if the voltage on the counter should decrease somewhat, say to 990 volts, there will be a decrease in amplitude and number of detectable pulses generated within the counter. Similarly, variations in the plate voltages applied to the selecting or discriminating tube and to the amplifying tubes preceding it may cause variations in the number and size of pulses transmitted by the selecting tube.

In accordance with the present invention, the number of pulses passed by the discriminating amplifier or tube, with constant neutron flux, is held constant irrespective of such changes in voltage across the counter, or in the plate circuits of the tubes or in other words, changes in voltage are automatically compensated for in the operation of the discriminating system. This is effected by automatically changing the grid bias on the discriminating amplifier with changes in voltage as above referred to through a control circuit in which such voltage changes affect the emissivity of the cathode filament of an electron tube which controls the bias on the grid of the said discriminating amplifier.

Figure 2:
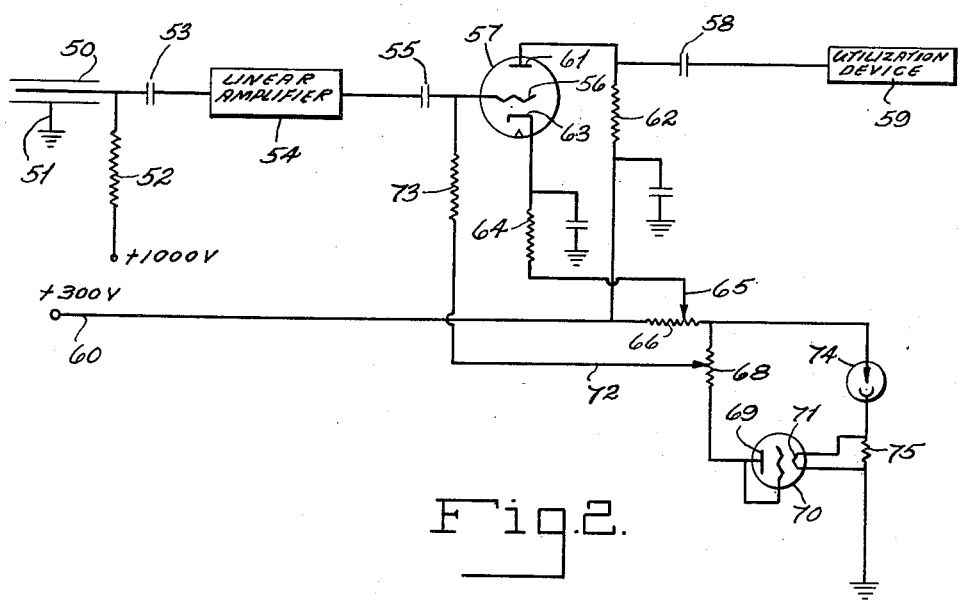

Circuits diagrammatically illustrating the present invention are shown in the accompanying drawings in which Fig. 1 is a diagrammatic drawing of a circuit embodying the present invention; and Fig. 2 is a diagrammatic drawing of another circuit embodying the present invention.

Referring more particularly to the circuit of Fig. 1, the numeral 10 designates a detector, which may suitably be of the type described in the Crumrine Patent No. 2,462,471 above referred to, and which is sensitized so that it responds to slow neutron bombardment. It is shown schematically and as is apparent, may be a single or a multiple detector. The cathode of the detector is shown as being grounded through the conductor 11. The necessary high voltage for operation of the detector is supplied from a suitable high voltage source through the resistor 12.

As has been pointed out above, the detector is operated with the applied high voltage across its electrodes of an order such that it acts as a proportional counter. Thus, for a detector of the type illustrated in the previous application above referred to, this voltage may be in the range of 600 to 1200 volts. In the circuit illustrated and described herein, the particular intended range of operation is in the order of 1000 to 1060 volts. Gamma rays which cause the emission of beta particles within the detector, result in pulses of smaller magnitude; and slow neutrons, which cause the emission of alpha particles from the sensitizing material used in the detector, cause the production of pulses of larger magnitude.

The pulses which are produced within the detector appear at its anode as negative pulses and are transmitted through coupling condenser 13 to an amplifier or amplifying train indicated at 14, in which they are linearly amplified and from which they are transmitted as positive amplified pulses through coupling condenser 15 to the grid 16 of the discriminating amplifier 17. Suitable means for linearly amplifying and reversing the pulses from the detector are shown, for example, in the U. S. Patent No. 2,557,636, which issued to Kenneth C. Crumrine on June 19, 1951, and was assigned to the assignee herein. Such amplification may be effected, for example, by means of a pentode tube such as an 1852 tube or by means of a triode, for example, by the use of one triode section of a 7F7 twin triode tube. The tube employed should be one suitable for amplification of a wide range of frequencies and having low capacitances.

The discriminator tube 17 is preferably a Class A amplifying tube having characteristics generally similar to those hereinbefore referred to and may similarly be a pentode tube such as an 1852 tube or a triode, such as the triode section of a 7F7 tube. In the drawings, such a triode section is diagrammatically illustrated. The cathode 18 is grounded, suitably through a resistor 19. The necessary voltage for the plate 20 of the tube 17 is impressed upon the plate, suitably through the resistor 21. The bias on the control grid 16 of the tube 17 is controlled so that it varies as a function of the voltage applied across the detector by the operation of the circuit as hereinafter described.

The operation of the tube 17 is such as to eliminate responses due to gamma rays, delivering substantially only pulses due to alpha particles within the detector resulting from neutron bombardment. These are delivered through coupling condenser 23 to a suitable utilization device 24, such as any of a plurality of recording or indicating means of known types.

The circuit for control of the grid bias on the tube 17 from the high voltage source, in this instance, for the detector, will now be described. The voltage from the high voltage source is impressed upon resistor 25 and potentiometer resistor 27, which are in series. From a suitable point on potentiometer 27 a conductor 28 leads to the control grid 29 of an electron discharge tube 30, which may suitably be an amplifier tube, such as a 6AG7 power tube. A positive voltage is impressed upon the cathode 31 of the tube 30, for example, through the battery 32, a suitable voltage being 16.5 volts. The necessary plate voltage is impressed upon the plate 33 of the tube 30 from any suitable source, for example, the battery 34. A suitable voltage is, for example, 225 volts. The screen grid of tube 30 is maintained at plate voltage and the suppressor grid at cathode voltage. The tap point on potentiometer 27 is chosen to provide a slight grid bias of, say, —1.8 volts on the control grid 29 with respect to the cathode.

The plate current of the tube 30 is superimposed on the heating current of the filament or cathode 35 of the triode 36, which is preferably a tube operating with a low filament voltage, such as a 1G4G tube and is of the directly heated filament type. The normal heating circuit for the filament includes a battery 37 and a potentiometer 38.

The cathode is connected through resistor 39, plate battery 40 and potentiometer 41 to the plate 42 of tube 36, the circuit being grounded on the positive side of the battery 40 through the conductor 43. The grid 44 of the tube 36 is connected to the plate, the tube operating as a diode.

The control grid 16 of the discriminator tube 17 is connected through resistor 46 and conductor 47 to a variable point on the potentiometer 41. The point of contact of this conductor with the potentiometer is selected to provide the desired negative bias voltage on the control grid of tube 17 to eliminate from its output pulses except those due to alpha particles.

In a circuit as illustrated in Fig. 1, in which the counter is intended to operate at a normal voltage of 1050 volts, the resistor 12 may suitably have a resistance of 0.1 megohm, the resistor 25 a resistance of 0.5 megohm, and the potentiometer resistor 27 a resistance of 10,000 ohms. The coupling condenser 13 may have a capacity of 0.00005 microfarad and the condensers 15 and 23 each a capacity of 0.001 microfarad. The filament heating battery 37 may have a voltage of 3 volts and the control potentiometer 38 a resistance of 600 ohms. The resistance of the resistor 39 may suitably be 2000 ohms and that of the potentiometer resistor 41 may be 15,000 ohms. The resistance of resistor 46 may suitably be 0.5 megohm; that of resistor 19, 2,000 ohms and that of resistor 21, 100,000 ohms.

In operation, in a specific illustrative instance, the parts are adjusted with 1,050 volts impressed across the counter, to provide a bias voltage on the control grid of tube 17 of —1.85 volts, the filament heating circuit for the cathode 35 of tube 36 being 26 milliamperes. With an increase in the voltage of the high voltage current applied to the counter, the voltage on the control grid 29 of the tube 30 becomes more positive. This results in an increase in the plate current, with a corresponding increase in the heating current of the filament 35 of tube 36. The temperature of the filament is accordingly increased, with a rapid increase in emissivity at the cathode of the tube 36. This causes a sharp response in the plate current with a drop in voltage at the point at which potentiometer 41 is tapped by conductor 47, resulting in an increase in negative voltage or bias of the grid 16 of the tube 17. As will be apparent, a reverse action takes place on decrease in the high voltage applied across the counter. In the illustrative instance, for example, on increase of the voltage applied across the counter to 1,065 volts, the negative voltage on the grid of tube 17 increased to —2.05 volts; and on decrease of the applied high voltage to 1,035 volts the bias voltage on the grid of tube 17 decreased to —1.65 volts.

With an illustrative circuit of the character hereinbefore described, with the counter subjected to a constant neutron flux, the counting rate of the pulses delivered by the tube 17 was held substantially constant over the range of voltages applied across the counter of from about 1,010 volts to about 1,065 volts, a range which exceeds the normal variations to which that voltage might ordinarily be subject.

The present invention may also be employed in a system where variations in counting rate may be due to changes in voltage elsewhere than at the source of the high voltage impressed across the detector electrode, for example, to variations in the voltage applied to the plate of the discriminator tube or of one or more of the amplifiers preceding it in the counting circuit. In Fig. 2 such a system is shown in connection with an unstabilized source of direct current voltage for the plate circuit of the discriminator tube.

In Fig. 2, the numeral 50 designates a detector of the type referred to in connection with Fig. 1; that is, a detector operating in the proportional counter range and sensitized to respond to slow neutron bombardment. The cathode of the detector 50 is shown as being grounded through the conductor 51. The necessary high voltage for operation of the detector is supplied from a suitable voltage source through the resistor 52.

The negative pulses resulting from the emission of ionizing particles within the detector are transmitted through coupling condenser 53 to an amplifier or amplifying channel indicated at 54 in which linear amplification of the pulses takes place and from which the amplified pulses are transmitted as positive pulses through coupling condenser 55 to the grid 56 of the discriminating amplifier 57, which may be a tube of the same character as is referred to in connection with the discriminator tube 17 of Fig. 1. The control grid of tube 57 is biased to eliminate responses of radiations within the detector, except those due to alpha particles resulting from slow neutron bombardment. The circuits for operation of the tube 57 will be hereinafter described. The pulses due to alpha particles within the detector are delivered from the plate circuit of the tube 57 through coupling condenser 58 to a suitable utilization device 59.

The circuits for operation of the discriminator tube 57 are derived from a voltage source which may be, for example, in the system illustrated, an unstabilized positive direct current voltage source of say about 300 volts, impressed upon the conductor 60. The voltage for the plate 61 of tube 56 is taken off the conductor 60 through the resistor 62. The cathode 63 is connected through resistor 64 and a tap 65 to the potentiometer 66 in the conductor 60 and in this way a suitable voltage differential between the plate 61 and the cathode 63 of tube 57 may be maintained.

Between the potentiometer 66 and the regulator tube 74, a connection from the line 60 extends through resistor 68 to the plate 69 of a control tube 70 having a directly heated cathode filament 71. This tube is preferably a tube of the same character as the tube 36 of Fig. 1 and may be, for example, a triode such as a 1G4G tube. From the potentiometer 68, a tap 72 leads to a resistor 73 and to the grid 56 of the discriminator tube 57, a suitable bias voltage being thus provided on the latter.

From the line 60 beyond the potentiometer 66 another tap leads to the gaseous regulator tube 74 and to ground. The regulator tube 74 may be, for example, a VR 150 tube. A suitable resistor 75 is provided in the line leading from regulator tube 74 to ground and the two ends of the heating circuit of the cathode filament 71 of the tube 70 are connected to opposite ends of the resistor 75.

As will be readily apparent, with any changes of the voltage on the line 60, and hence on the plate circuit of the discriminator tube 57, the current through the directly heated cathode filament of the tube 71 will be directly affected and the resulting changes in its emissivity will result in corresponding changes in the plate circuit through the tube 70 and inversely affect the voltage on the grid 56 of the discriminator tube 57. Thus, with increases in the voltage in line 60, the negative bias on the grid 56 of tube 57 will be increased and with decreases in the voltage applied to line 60, the reverse change will take place.

Thus, with any increase in voltage on the line 60, there will be a slight increase in voltage across the resistor 75 and upon the cathode filament 71 of tube 70. This will result in a greater flow of current through the tube 70 and a decrease in voltage at the point on the potentiometer 68 with which the tap 72 is in contact. A corresponding increase in bias on the grid 56 of tube 57 takes place. On decrease in the voltage on the line 60, the reverse action takes place and the bias on the grid 56 of the discriminator tube 57 is decreased.

In a circuit as illustrated in Fig. 2, in which the detector is intended to operate at a normal voltage of 1000 volts and the voltage impressed on the conductor 60 of about 300 volts, the resistance of resistor 52 may suitably be 0.1 megohm. The capacity of coupling condenser 53 may be 0.00005 microfarad and the capacities of condensers 55 and 58 may each be 0.001 microfarad. The resistance of resistor 64 may be 50,000 ohms and that of resistor 62 0.1 megohm. The resistances of potentiometer resistors 66 and 68 may be 5000 ohms and 50,000 ohms respectively. The resistance of resistor 73 may be 0.05 megohm, and that of resistor 75 in a range to provide a current through the filament of tube 70 of the order of 8 to 34 milliamperes. A suitable resistance for the resistor 75 is in the order of 150 ohms.

In a circuit as above described, with the voltage impressed upon the conductor 60 in the order of +300 volts, with a detector operating in a stabilized high voltage of 1000 volts across the electrodes and with a constant neutron flux, a substantially constant counting rate was secured in the output from the discriminator tube with variations in the voltage on plate 61 ranging from 240 to 260 volts.

Although the present invention has been described in connection with the specific details of certain circuits or systems embodying the same, it will be understood that it is not to be limited to the details thereof except in so far as embodied in the accompanying claims.

We claim:

1. Electrical apparatus comprising a detector tube for converting radiation into electrical pulses; a pulse-amplitude-selective tube having at least a cathode, an anode, and a control electrode; means electrically connecting the output of the detector tube to said control electrode to apply said pulse thereto in positive polarity; a source of direct high voltage energizing potential for at least one of said tubes, said energizing potential being subject to unintended variations; means for applying a negative threshold bias between the control electrode and cathode of said selective tube; means responsive to variations in said energizing potential for correspondingly varying said threshold negative bias, said means including a control tube having a thermionic cathode, a heater circuit for applying direct current to heat said thermionic cathode, means coupled between said source of direct high voltage energizing potential and said heater circuit for varying the direct current heating of said thermionic cathode in accordance with said variations in said energizing potential, an anode in said control tube, anode circuit means for producing a bias voltage varying in accordance with the variations in energizing potential and cathode heating, and means for applying between said control electrode and cathode of the selective tube voltage changes produced in the anode circuit of the control tube.

2. Apparatus as in claim 1 in which said thermionic cathode of the control tube includes a heater and said means for varying the direct current heating of said thermionic cathode comprises an amplifier tube whose control grid is connected to said source of energizing potential and whose anode-cathode circuit is connected in series with the heater of said thermionic cathode.

KENNETH C. CRUMRINE.
ROY P. MAZZAGATTI.

References Cited in the file of this patent

UNITED STATES PATENTS

| Number | Name | Date |
|---|---|---|
| 1,778,058 | Barton | Oct. 14, 1930 |
| 1,931,070 | Gullner et al. | Oct. 17, 1933 |
| 2,063,304 | Farrow, Jr. | Dec. 8, 1936 |
| 2,237,409 | Burnside | Apr. 8, 1941 |
| 2,468,082 | Chatterjea | Apr. 26, 1949 |